April 15, 1952     E. J. KRAFT     2,593,315
FLOW CONTROL DEVICE
Filed Oct. 31, 1946
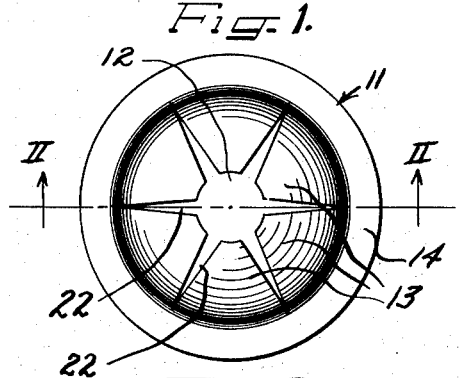
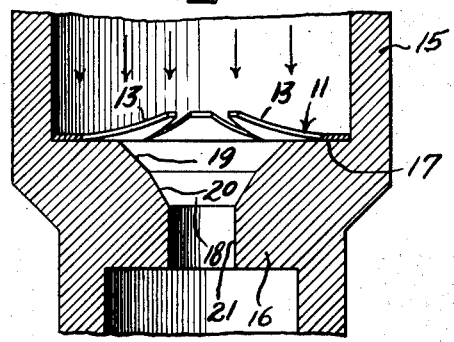
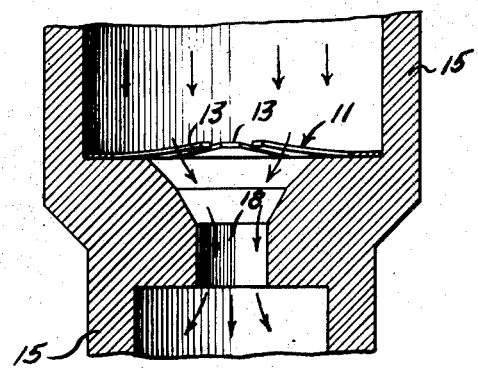
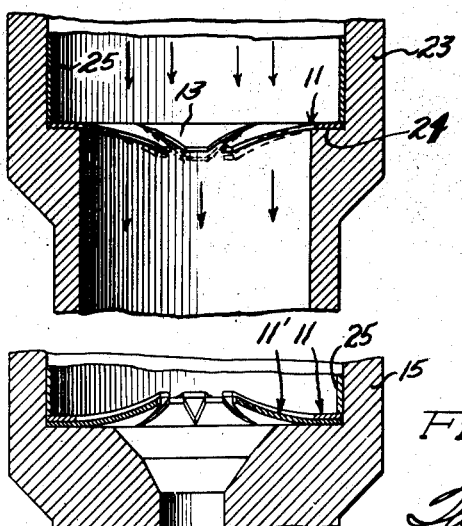
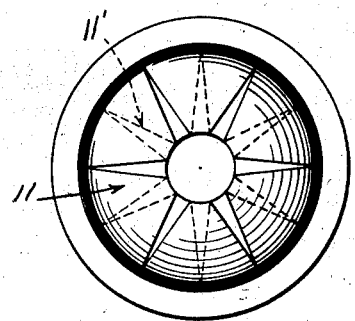
INVENTOR.
ELROY J. KRAFT
BY
Attys.

Patented Apr. 15, 1952

2,593,315

UNITED STATES PATENT OFFICE 2,593,315

FLOW CONTROL DEVICE

El Roy J. Kraft, Oak Park, Ill., assignor to The Dole Valve Company, Chicago, Ill., a corporation of Illinois Application October 31, 1946, Serial No. 706,892

9 Claims. (Cl. 138—45)

1

This invention relates to a flow control member and to a method of controlling the flow of fluid, and more particularly, to a novel member and method for automatically maintaining either a substantially uniform rate of flow of fluid irrespective of wide variations in fluid pressure or to a novel member and method for automatically increasing the rate of fluid flow at an accelerated rate as fluid pressure increases.

A novel method and means for maintaining a uniform rate of flow irrespective of wide variations in fluid pressure is disclosed in the Clyde A. Brown Patent No. 2,389,134, entitled "Flow Control Valve," granted November 20, 1945. The flow control member which is described in this Patent No. 2,389,134, is a resilient washer of rubber or some other similar material having a central orifice which is seated on a shoulder, and which shoulder terminates at a point spaced radially outwardly from the orifice. By controlling the dimension of the orifice with respect to the dimension of the shoulder and the relative stiffness of the washer to flexure, substantially uniform flow may be maintained irrespective of wide fluctuations in fluid pressure.

This is due to the fact that upon increase of fluid pressure, the washer flexes and decreases the size of the central orifice.

Some difficulty has been experienced with a flow control member such as that described in the Clyde A. Brown Patent No. 2,389,134, due to the wear to which the member is subjected by the fluid passing thereover. Metallic materials such as brass which would have good wear-resisting properties have not been used in the past due to the fact that metal is so much stiffer than rubber or other materials of that category that a disk of metal with a round hole in the center would not give the desired control feature.

One of the principal features and objects of the present invention is to provide a novel flow control member having a shape and configuration which enable metals such as brass or steel to be used, but which at the same time gives highly uniform results and possesses exceptionally fine wear-resisting properties.

A further object of the present invention is to provide a novel method for controlling the flow of fluid.

A still further object of the present invention is to provide a novel flow control member having an integral annular portion and a plurality of tongues projecting inwardly toward a central opening.

Another object of the present invention is to

2 provide a novel means for controlling the flow of fluid in which a greatly accelerated fluid flow is obtained as pressure increases.

Another and still further object of the present 5 invention is to provide a novel fluid control device in which substantially uniform rate of flow is maintained over a wide range of fluid pressures.

The novel features which I believe to be characteristic of my invention are set forth with particularity in the appended claims. My invention itself, however, both as to its manner of construction and method of control, together with further objects and advantages thereof may best be understood by reference to the following description, taken in conjunction with the accompanying drawing, in which:

Figure 1 is a plan view of a flow control member constructed in accordance with the teachings of the present invention;

Figure 2 is a vertical sectional view taken along the line II—II of Figure 1;

Figure 3 is a longitudinal sectional view through a pipe or conduit having a flow control member therein of the type illustrated in Figures 1 and 2;

Figure 4 is a view similar to Figure 3 but illustrates the manner in which the flow control member is deformed as fluid pressure increases;

Figure 5 is a longitudinal sectional view through a pipe or conduit with the flow control member of Figures 1 and 2 shown in position to give a greatly accelerated increase in fluid flow as fluid pressure increases;

Figure 6 is a view similar to Figure 1 illustrating a modified form of the present invention; and Figure 7 is a fragmentary vertical section showing the manner in which the double flow members of Figure 6 are mounted.

The flow control member illustrated in Figures 1 and 2 of the drawing includes a thin disk 11 formed of a relatively stiff resilient material such as brass or steel. The disk 11 has a central opening 12 therein and a plurality of inwardly projecting tongues 13. The disk 11 includes an annular portion 14 which is integral with the tongues 13 and from which the tongues 13 project.

The tongues 13 in their normal unstressed position not only project inwardly toward the opening 12, but also project slightly upwardly as is clearly shown in Figure 2 of the drawing.

In Figures 3 and 4 of the drawing, I have illustrated the flow control member 11 mounted in a pipe or conduit 15 having a radially inwardly projecting flange 16 which provides a shoulder or seat 17 for supporting the flow control member 11. The radial inner end of the flange 16 defines a double frusto-conical opening 18. That is to say, the opening 18 below the flow control member 11 converges rather rapidly in the first frusto-conical portion 19 and then less rapidly in the second frusto-conical portion 20 and terminates in a cylindrical passageway portion 21. Fluid is arranged to flow through the pipe 15 in the direction indicated by the arrows in Figures 3 and 4 of the drawing. As the fluid pressure increases, the tongues 13 are bent downwardly closer and closer to the plane of the outer annular portion 14. As they bend downwardly, the central opening 12 becomes smaller as well as the radial darts 22 lying between the tongues 13, thus decreasing the size of the opening through which fluid can pass.

From a comparison of Figures 3 and 4 of the drawing, a further action will also be noted, and that is that as the fluid pressure increases, the inner edge of the supporting region of the shoulder 17 moves closer and closer to the center opening 18, thus decreasing the effective unsupported lengths of the tongues 13. This, in effect, increases their stiffness as the pressure increases, a feature which is necessary to maintain uniform flow as the pressure increases.

To put this in a somewhat different way, it has been found that if the flow member 11 is supported only at the annular portion 14, increase of pressure causes too rapid closing of the tongues 13 and thus overcompensates for the increase in pressure. This in turn would cause a decrease in the flow rate as pressure increases.

By providing a support for the flow member 11 which provides a supporting region which progressively moves toward the center as the pressure increases, very accurate control may be obtained and substantially uniform rate of flow results over wide variations on fluid pressure.

Under certain circumstances, it is sometimes desirable to provide a flow member which will give a rapidly accelerating fluid flow as pressure increases. It has been found that the flow member illustrated in Figures 1 and 2 of the drawing will provide such a characteristic when mounted in a pipe 23 on a shoulder 24 in an inverted position as shown in Figure 5 of the drawing.

The flow member 11 is held in place by a locking ring 25 which is wedged or otherwise secured in the pipe 23. With fluid flowing in the direction as shown by the arrows in Figure 5, increase in pressure will deflect the tongues 13 downwardly as is indicated by the dotted line, thus increasing the size of the opening. Thus, an accelerated increase in fluid flow is obtained as the pressure increases.

In Figures 6 and 7 of the drawing, I have illustrated a modified form of the present invention. More particularly, a pair of flow members 11 and 11' are employed rather than a single flow member as shown in Figures 1 to 4 of the drawing. The two flow members 11 and 11' are arranged so that the radial darts 22 on the disk 11 are staggered with respect to the radial darts 22 on the disk 11'. It will thus be apparent that the second disk or flow member covers up the free flow caused by the dart-shaped slot of the first disk, and, therefore, the only exposed area is the round area in the center of the disk. The use of a second flow member also gives greater stiffness to the flow member assembly, and thereby enables thinner material to be used.

While two flow members 11 and 11' are illustrated, it will, of course, be apparent that any number of such members may be employed.

In Figure 7 of the drawing, I have illustrated how these flow members may be mounted on the shoulder 24. The flow members 11 and 11' may be retained in place by a lock ring 25 such as the lock ring 25 shown in Figure 5. It will, of course, be apparent that this lock ring 25 may be employed if desired when a single flow member 11 is used, such as the single flow member assembly of Figures 1 to 4.

While I have shown certain particular embodiments of my invention, it will, of course, be understood that I do not wish to be limited thereto, since many modifications may be made, and I, therefore, contemplate by the appended claims to cover all such modifications as fall within the true spirit and scope of my invention.

I claim as my invention:

1. A flow control member comprising a thin disk formed from resilient metal having a relatively flat outer ring and having a plurality of flexible tongues extending inwardly therefrom and converging toward their ends, leaving radially extending wedge-shaped sectors therebetween and turning from the plane of said ring in a regular curve in an upstream direction, and the area between said tongues forming a passageway closing as the pressure on said tongues increases and flexes them inwardly toward the plane of said ring.

2. A flow control member comprising an annulus having a plurality of integral resilient tongues projecting inwardly toward the center of said annulus, said tongues curving from the plane of said annulus in an upstream direction and lying out of the plane of said annulus in their normal unstressed condition, said tongues terminating short of the center of said annulus thereby to define a central opening and said tongues being relatively wide and shaped to provide relatively narrow wedge-shaped slots between adjacent tongues radiating from said central opening and restricting the flow area through said annulus upon increases in head on said tongues.

3. A fluid control device comprising a casing having a passageway extending therethrough, a shoulder in said passageway facing the upstream side thereof and extending radially inwardly from the side wall thereof, an elastic member seated on said shoulder and extending substantially into engagement with said side wall, said member having an annular portion and a plurality of integral tongues projecting inwardly from said annular portion beyond the inner end of said shoulder, said tongues in a normal unstressed position being formed to bend upwardly in an upstream direction as well as inwardly, thereby to provide for flexing of said tongues in a downstream direction upon flow of fluid through said member and whereby the opening in said member defined by said tongues is decreased as a function of fluid pressure.

4. A fluid control device comprising a casing having a passageway extending therethrough, a shoulder in said passageway facing the upstream side thereof and extending radially inwardly from the side wall thereof, a member of resilient material including an annular portion seated on said shoulder and a plurality of integral tongues extending inwardly and upwardly in an upstream direction, said tongues terminating short of the center axis of said annular portion thereby to define a central opening, said tongues being relatively wide and having wedge-shaped slots between adjacent tongues radiating outwardly from said central opening, thereby to provide for flexing of said tongues in a downstream direction upon flow of fluid through said orifice and thereby to decrease the size of the opening through said member as a function of fluid pressure.

5. A fluid control device comprising a casing having a passageway extending therethrough, a shoulder in said passageway facing the upstream side thereof and extending radially inwardly from the side wall thereof, a member of resilient material including an annular portion seated on said shoulder and a plurality of integral tongues extending inwardly and upwardly in an upstream direction, said tongues terminating short of the center axis of said annular portion thereby to define a central opening, said tongues being relatively wide and having wedge-shaped slots between adjacent tongues radiating outwardly from said central opening, said tongues being normally out of engagement with said shoulder to at least the greater part of their lengths, thereby to provide the flexing of said tongues in a downstream direction upon flow of fluid through said member, said tongues being arranged to be supported by said shoulder in regions which lie progressively nearer the center axis of said passageway as the fluid pressure increases, thereby to progressively stiffen said tongues as fluid pressure increases.

6. A flow control member comprising a plurality of elastic rings, each having a plurality of integral elastic tongues projecting inwardly toward the center of each ring and out of the plane of each ring, said tongues terminating short of said center thereby to define a central opening, the tongues of one ring being offset laterally with respect to the tongues of an adjacent ring whereby the only opening through said assembly of rings is said central opening.

7. A flow control member comprising a pair of rings each having a plurality of integral resilient tongues projecting inwardly toward the center axes of said rings and out of the plane of each ring, said tongues terminating short of the center axes of said rings thereby to define a central opening and said tongues being relatively wide and shaped to provide relatively narrow wedge-shaped slots between adjacent tongues radiating from said central opening, the tongues of one ring overlapping the tongues of the other ring and being staggered laterally whereby the tongues of one ring cover the wedge-shaped slots of the other ring.

8. A flow control member comprising a thin disk formed from resilient metal having a relatively flat outer ring and having a plurality of flexible tongues extending inwardly therefrom and converging toward their ends, leaving radially extending sectors therebetween and turning from the plane of said ring in a regular curve in a direction contra to the direction of flow through said member, said tongues stopping short of the center of said disk and said sectors and the space between the ends of said tongues forming a flow passageway closing as the pressure on said tongues increases and flexes them inwardly toward the plane of said ring.

9. A flow control device comprising a casing having a passageway extending therethrough, said passageway having a restricted portion thereof forming a shoulder on the upstream side of said restricted portion, a thin disk formed from resilient metal having a relatively flat outer ring seated on said shoulder and having a plurality of flexible integrally formed tongues projecting inwardly toward the center thereof and converging toward their ends, leaving radially extending sectors therebetween and curved to extend out of the plane of said ring in a direction contra to the direction of flow through said passageway, said tongues stopping short of the center of said disk and said sectors and the space between the ends of said tongues forming a flow passageway closing upon increases in pressure on said tongues flexing them toward the plane of said ring.

EL ROY J. KRAFT.

REFERENCES CITED

The following references are of record in the file of this patent:

UNITED STATES PATENTS

| Number | Name | Date |
| --- | --- | --- |
| 1,097,977 | James | May 25, 1914 |
| 1,697,528 | Kahn | June 1, 1929 |
| 1,885,559 | Smith | Nov. 1, 1932 |
| 1,986,252 | Conran | Jan. 1, 1935 |
| 2,009,967 | Dahnke | July 30, 1935 |
| 2,389,134 | Brown | Nov. 20, 1945 |